(12) United States Patent
Sabiwalsky et al.

(10) Patent No.: US 10,372,887 B2
(45) Date of Patent: Aug. 6, 2019

(54) BROKER-BASED MESSAGING THROUGH SQL

(71) Applicant: SAP SE, Walldorf (DE)

(72) Inventors: Dirk Sabiwalsky, Sandhausen (DE);
Henrike Schuhart, Wiesloch (DE);
Christoph Scheiber, Reilingen (DE);
Timur Fichter, Schwetzingen (DE)

(73) Assignee: SAP SE, Walldorf (DE)

( * ) Notice: Subject to any disclaimer, the term of this patent is extended or adjusted under 35 U.S.C. 154(b) by 273 days.

(21) Appl. No.: 15/168,491

(22) Filed: May 31, 2016

(65) Prior Publication Data

US 2017/0329945 A1    Nov. 16, 2017

Related U.S. Application Data (60) Provisional application No. 62/334,742, filed on May 11, 2016.

(51) Int. Cl.
| | | |
|---|---|---|
| *H04L 29/06* | (2006.01) | |
| *G06F 21/31* | (2013.01) | |
| *H04L 29/08* | (2006.01) | |
| *G06F 9/54* | (2006.01) | |
| *G06F 16/2455* | (2019.01) | |

(52) U.S. Cl.
CPC .............. *G06F 21/31* (2013.01); *G06F 9/546* (2013.01); *G06F 16/2455* (2019.01); *H04L 63/083* (2013.01); *H04L 67/2809* (2013.01); *H04L 63/0884* (2013.01)

(58) Field of Classification Search
CPC .... G06F 21/31; G06F 9/546; G06F 17/30477;
G06F 17/30; G06F 16/23; G06F 16/21;
G06F 16/2438; G06F 16/245; G06F 16/25; H04L 67/2809; H04L 63/083
See application file for complete search history.

(56) References Cited

U.S. PATENT DOCUMENTS

| | | | |
|---|---|---|---|
| 6,418,448 B1 * | 7/2002 | Sarkar | ............... G06F 17/30893 |
| 6,510,429 B1 * | 1/2003 | Todd | ....................... G06F 9/542 |
| | | | 705/36 R |
| 7,603,260 B2 | 10/2009 | Schmitz et al. | |
| 8,306,862 B2 | 11/2012 | Weiler et al. | |
| 8,412,549 B2 | 4/2013 | Graeber et al. | |
| 8,473,584 B2 | 6/2013 | Sabiwalsky | |
| 8,560,392 B2 | 10/2013 | Asal et al. | |
| 8,615,451 B1 | 12/2013 | Thiele et al. | |
| 9,146,802 B2 | 9/2015 | Tran et al. | |
| 2002/0120918 A1 * | 8/2002 | Aizenbud-Reshef | ..... G06F 8/34 |
| | | | 717/127 |
| 2002/0120919 A1 * | 8/2002 | Aizenbud-Reshef | ..... G06F 8/34 |
| | | | 717/127 |

(Continued)

*Primary Examiner* — Amir Mehrmanesh
(74) *Attorney, Agent, or Firm* — Fish & Richardson P.C.

(57) ABSTRACT

The disclosure generally describes methods, software, and systems, including a method for publishing messages through a messaging client of a database server. A message to be published to one or more message brokers is received at a server and from a database client. The message is in the form of a SQL statement. The received message is processed at the server. Message broker configurations associated with the received message are determined. The message is published to the one or more message brokers by invoking a messaging client at the server and using at least the message broker configurations.

18 Claims, 3 Drawing Sheets

(56) References Cited

U.S. PATENT DOCUMENTS

| | | | |
|---|---|---|---|
| 2002/0129023 A1* | 9/2002 | Holloway | G06F 17/30595 |
| 2002/0141449 A1* | 10/2002 | Johnson | G06F 9/546 |
| | | | 370/473 |
| 2005/0288974 A1* | 12/2005 | Baranowski | G06Q 10/02 |
| | | | 705/6 |
| 2007/0162421 A1* | 7/2007 | Pang | G06F 17/30516 |
| 2010/0058355 A1* | 3/2010 | Gernaey | H04L 63/0254 |
| | | | 719/313 |
| 2010/0161362 A1* | 6/2010 | Shapira | G06Q 10/00 |
| | | | 705/7.11 |
| 2011/0131242 A1* | 6/2011 | Bent | G06F 17/30545 |
| | | | 707/770 |
| 2011/0295882 A1* | 12/2011 | Mascarenhas | G06F 17/30427 |
| | | | 707/769 |
| 2012/0215832 A1* | 8/2012 | Bhogal | G06F 9/542 |
| | | | 709/203 |
| 2013/0080452 A1* | 3/2013 | Hosie | G06F 16/23 |
| | | | 707/752 |
| 2013/0179229 A1 | 7/2013 | Graeber et al. | |
| 2014/0006221 A1 | 1/2014 | Thiele et al. | |
| 2014/0006222 A1 | 1/2014 | Hericks et al. | |
| 2017/0193559 A1* | 7/2017 | Alicherry | G06Q 30/0271 |

\* cited by examiner

BROKER-BASED MESSAGING THROUGH SQL

CLAIM OF PRIORITY

This application claims priority under 35 USC § 119(e) to U.S. Patent Application Ser. No. 62/334,742, filed on May 11, 2016, the entire contents of which are hereby incorporated by reference.

BACKGROUND

The present disclosure relates to messaging systems.

Data can originate on devices and through applications. Some of the data is stored in databases, and other data is transmitted as messages. For example, messages can originate from a mobile device, such as through a text message. Other messages can be sent through email systems, applications, and other sources.

SUMMARY

The disclosure generally describes computer-implemented methods, software, and systems for broker-based messaging through structured query language (SQL). In some implementations, publishing messages can occur using a messaging client of a database server. For example, a message to be published to one or more message brokers can be received at a server from a database client. The message can be in the form of a SQL statement. The received message can be processed at the server. Message broker configurations associated with the received message can be determined. The message can be published to the one or more message brokers by invoking a messaging client at the server and using at least the message broker configurations.

One computer-implemented method includes: receiving, at a server and from a database client, a message in the form of a SQL statement to be published to one or more message brokers; processing, at the server, the received message; determining message broker configurations associated with the received message; and publishing, by invoking a messaging client at the server, the message to the one or more message brokers using at least the message broker configurations.

The foregoing and other implementations can each optionally include one or more of the following features, alone or in combination. In particular, one implementation can include all the following features:

In a first aspect, combinable with any of the previous aspects, the SQL statement is a call statement including a schema name, a message broker identifier, a topic, a quality of service, and the message.

In a second aspect, combinable with any of the previous aspects, the quality of service is a code that indicates that the message is to be published at least once, at most once, or exactly once.

In a third aspect, combinable with any of the previous aspects, the method further includes: receiving, at the server and from the database client, user credentials for authentication, by the database server, with the message broker prior to publishing the message; and before publishing the message, authenticating with the message broker using the received credentials.

In a fourth aspect, combinable with any of the previous aspects, receiving the user credentials includes receiving, from the database client, credential creation statements identifying a user identifier and a password for the user.

In a fifth aspect, combinable with any of the previous aspects, the user credentials are received with the message.

In a sixth aspect, combinable with any of the previous aspects, the message further identifies the message broker, and wherein publishing the message includes accessing user credentials in a credential store.

In a seventh aspect, combinable with any of the previous aspects, publishing the message does not require that the message be sent, to the message broker, from an application layer outside of the database server.

In an eighth aspect, combinable with any of the previous aspects, the message includes one or more of a text message and one or more data elements from database tables.

In a ninth aspect, combinable with any of the previous aspects, the method further includes: receiving, at the server and from the database client, a definition of a message broker destination; and before publishing the message, retrieving information associated with the message broker for use in publishing the message, wherein the definition of the message broker destination includes a schema name, an identifier for a particular message broker, a distribution type, and a connection string identifying a host, a port, and connection parameters for connecting to a particular message broker.

In a tenth aspect, combinable with any of the previous aspects, publishing the message includes using a previously-stored message broker configuration or using a new message broker configuration received from the database client with the message to be published.

In an eleventh aspect, combinable with any of the previous aspects, the method further includes: executing database triggers in the database server upon a change in a database; generating, using trigger information from the triggers, a trigger-initiated message to be published; and publishing, by invoking the messaging client at the server, the trigger-initiated message to the one or more message brokers using at least the message broker configurations and the trigger information.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

This disclosure generally describes computer-implemented methods, software, and systems for a broker-based, SQL-driven messaging system. For example, data and messages can originate from (or be used by) almost any device or application, or any kind of control system, machinery, or other equipment, including those associated with Internet of Things (IoT) technologies. Some of the data can be integrated into databases, while other data can be sent as messages. This disclosure combines the technologies, providing techniques for using database technologies to broker and publish messages. As a result, automatic notifications can be generated using SQL to notify multiple message recipients of events, updates to data, changes in database structure, and other information.

The subject matter described in this specification can be implemented in particular implementations so as to realize one or more of the following advantages. Text messages can be published to a message broker using a simple SQL procedure. Higher-level programming languages are not needed to broker messages. For example, message publishing can occur entirely within the database without requiring the use of an application layer outside of the database server. Standard database clients can publish messages to a broker using SQL.

This document describes techniques for broker-based messaging from within SQL. For example, using techniques that include mechanisms that are part of a database server, text messages can be published to a message broker using a simple SQL procedure. Some of the mechanisms described herein represent significant improvements over existing messaging systems that are not broker-based and SQL-driven messaging systems.

In some implementations, using the techniques described herein, available message brokers can be configured and are thereafter available to serve as destinations of brokered messages. Authentication settings, e.g., using existing secure credential stored in a database server, can also be configured and used to authenticate access to particular brokers.

In some implementations, preconditions can be required before serving messages using broker-based messaging from within SQL. For example, one such precondition can include establishing, such as before a message is sent, a connection to an external message broker. In the context of broker-based messages, for example, destinations of the messages are to be defined. For example, a destination can include a logical identifier of a particular message broker and can include connection parameters that describe a connection to the particular message broker. Credential settings such as user name and password, which are used to authenticate at the message broker, can be stored within a secure credential store. Therefore, a second precondition is that credentials, such as user name and password, can be stored securely and retrieved while establishing the connection to the message broker.

A concept associated with this disclosure is the concept of publishing messages (e.g., text messages) to one of these destinations using a SQL procedure. The SQL procedure, for example, can be a built-in procedure within the database. While text messages are used as examples of messages that can be sent using a broker-based messaging through SQL, other message types and message contents are possible including, for example, contents of database tables and/or other information. As another example, messages can include particular key performance indicators (KPIs) or other information that is published regularly. Further, one or more KPIs can be associated with statistics associated with publishing messages using the broker-based messaging through SQL.

Figure 1:
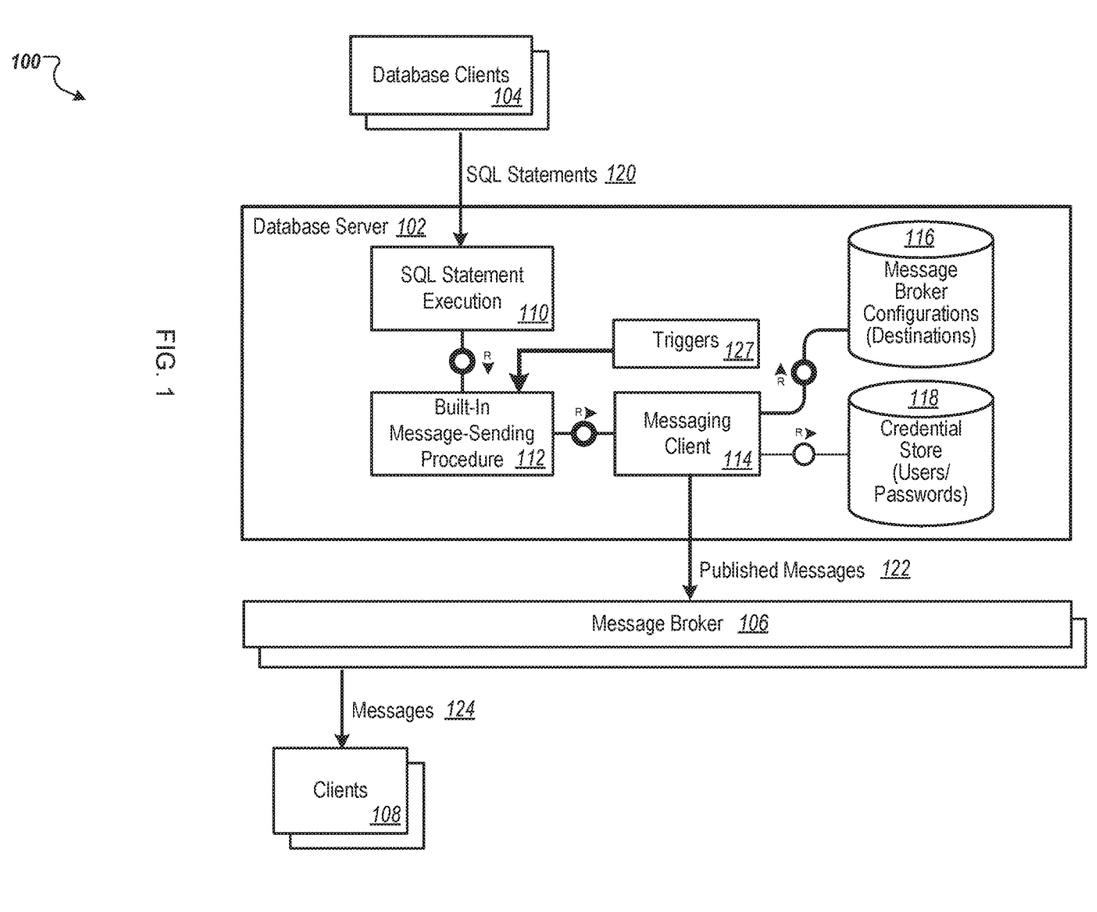
FIG. 1 is a block diagram of an example environment that provides broker-based messaging via SQL.

FIG. 1 is a block diagram of an example environment 100 that provides broker-based messaging via SQL. For example, the environment 100 includes a database server 102 that performs functions related to a database, such as receiving data and providing data, e.g., in response to a request. In the context of the current disclosure, the database server 102 can perform functions that are associated with receiving and sending messages.

The database server 102 can communicate, for example, with one or more database clients 104, which can include applications that execute on one or more user devices such as mobile devices, desktop devices, laptop devices, and other computer devices. The database clients 104 can include, for example, user interfaces that are presented to users, but can also include other computer systems that do not involve users, such as stand-alone computer systems that are linked to the database server 102 for various reasons, or even embedded system. The database server 102 can also communicate, for example, with one or more message brokers 106, each serving messages to one or more clients 108, which can include some or all of the various types of computer systems that are provided by the database clients 104. Examples of database clients 104 and clients 108 include various types of entities, including applications, control systems, and any machinery/equipment that is accessible within an IoT network. As a result, an entity can be a message sender, a message receiver, or both a message sender and a message receiver.

The database clients 104 can include, for example, any external applications, such as applications that read and/or modify database tables. The database clients 104 can use, for example, interfaces with the database server 102 to publish messages and serve as a communication between the database server 102 and applications of the database clients 104. In some implementations, the interface with the database server 102 can be initiated by a user action, such as selecting a control or some other action or event. For example, the control can be a button in an invoicing or other user interface, and pressing the button can mean that an invoice or other document has been created, modified, or deleted, resulting in a change of data. As a result, SQL statements 120 can be sent by the database client 104 for processing by the database server 102. For the SQL statements 120 to be sent, authorization of users associated with the database clients 104 must exist and be authenticated in the credential store 118. The received SQL statements 120 can be processed by a SQL statement execution module 110.

Upon execution of SQL statements, a built-in message-sending procedure 112 can invoke a messaging client 114 that will actually provide published messages 122 to one or more message brokers 106. In order to determine which message is to be published and how publication is to occur, the built-in message-sending procedure 112 can use information associated with the received SQL statement 120 that has been executed in combination with the message broker configurations 116 to identify the destinations of the messages.

In some implementations, a definition of a message broker destination, such as a particular message broker 106, can be made using a SQL-related statement such as the following procedure call (statement 1):

CALL <some schema name>."MESSAGING_DESTINATIONS::insert"(<dst-id>, <dst-type>, <connection-string>);   (1)

where <some schema name> refers to a name of a database schema, <dst-id> is an identifier for a particular message broker, <dst-type> is the type of distribution (e.g., text, email, etc.) that is to apply to messages brokered by the particular message broker, and <connection-string> includes a string of connection parameters specifying, for example, a host, a port, and additional parameters for connecting to the particular message broker. In some implementations, definitions of message broker destinations can be stored in a data store of message broker configurations 116. The SQL-statement above may not include, or may merely reference, a particular message broker destination, where the information included in the message, the sender of the message, or other related information regarding the message can be used to identify a particular message broker configuration 116 for where the corresponding message is to be sent.

In some implementations, credentials of database clients 104 can be defined, for example, using CREATE procedure calls, such as (statement 2):

```
CREATE CREDENTIAL FOR USER <user> COMPONENT
MESSAGING
    PURPOSE <dst-id> TYPE 'USER' USING <dst-user>        (2)
``` for creating account-level credentials for a user identified by <dst-user>, and (statement 3):

```
CREATE CREDENTIAL FOR USER <user> COMPONENT
MESSAGING
    PURPOSE <dst-id> TYPE 'PASSWORD' USING <dst-password>    (3)
``` for creating a password for the same user, the password contained in <dst-password>. In some implementations, both CREATE commands are provided at the same time, such as to bind the password to the user. In some implementations, user credentials can be stored in a credential store 118, e.g., for use by the database server 102. In some implementations, different types of credentials can be used and stored in the credential store 118, which can be a secure data store.

Database clients 104, in order to cause the database server 102 to publish messages to pertinent message brokers, can use a built-in SQL procedure such as in the form of a CALL procedure (statement 4):

```
CALL <some schema name>.SEND_TEXT_MESSAGE(<dst-id>,
                <topic>, <QOS>, <message>)              (4)
```

Using information associated with message broker destinations, for example, the database server 102 can parse information in the CALL statement to publish messages to one or more particular message brokers 106. In some implementations, built-in SQL procedures can be used that cause messages to be issued to the message broker(s) 106.

Execution of the call, for example, can cause the message identified by <message> to be published to a given message broker destination identified by <dst-id>. The message can be published in the context of a certain topic/subject identified by <topic>. For example, the topic can be a specific subject or other entity to which other consumers (e.g., clients 108) may subscribe through one or more message brokers 106. For example, clients 108 who have subscribed to particular topics of a message broker 106 can receive messages 124 that are based on the published messages 122 provided by the database server 102. The quality of server <QOS> argument in the CALL can describe how the message broker 106 is to process the message, such as whether or not the message is persisted. In some implementations, a QOS of 0 can represent "at least once" (that the message is sent), a QOS of 1 can represent "at most once," and a QOS of 2 can represent "Exactly Once." Other QOS values are possible. In some implementations, a message length of a message can be limited, such as at 4096 characters or some other limit. Success of the SQL call can depend on the QOS. For example, the SQL call can be determined as successful if, for a QOS of 0, the message could be sent to the message broker 106, or if, for QOS 1 or 2, the message broker 106 has sent an acknowledge.

In some implementations, published messages 122 can include, for example, text messages, such as for database clients 104 that are smartphones, mobile devices, or other computer devices capable of sending a text message. Published messages 122 can also include data elements (e.g., from one or more database tables) or other information.

Database permissions are also a consideration for being able to send messages. For example, in some implementations, in order to be able to invoke the SQL messaging procedure, a user must be granted the execute permission on the SQL procedure object, e.g., <some schema name>.SEND_TEXT_MESSAGE.

In some implementations, clients 108 can connect to a particular message broker 106 by establishing a network connection. For example, before messages are sent, the message broker 106 can require authentication, such as requiring the messaging client 114 to provide user passwords to open a connection with the message broker 106. In some implementations, user credentials can include secret information that is known only by a user, such as a username and password combination.

In some implementations, the database server 102 can make use of triggers 127 that can affect messages that are published. For example, triggers 127 can be established to perform a specific function based on control events received from the database clients 104, specific changes in the database, such as a table change or a key change, or other events. Upon execution of a trigger 127, SQL statements associated with the trigger can be executed. In some instances, the SQL statements can cause one or more published messages 122 to be sent to one or more message brokers 106. In some implementations, other database clients can be used, such as to read and/or publish messages.

Figure 2:
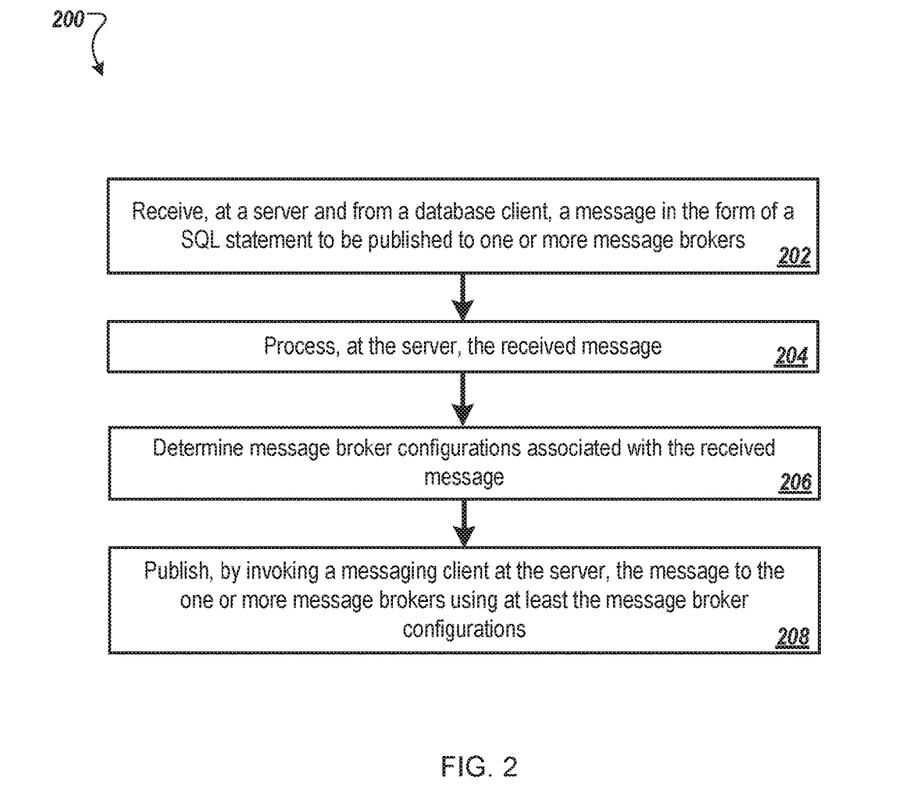
FIG. 2 is a flowchart of an example method for publishing messages through a messaging client of a database server.

FIG. 2 is a flowchart of an example method 200 for publishing messages through a messaging client of a database server. For clarity of presentation, the description that follows generally describes method 200 in the context of FIG. 1.

At 202, a message to be published to one or more message brokers is received at a server and from a database client. The message is in the form of a SQL statement. For example, the database server 102 can receive a SQL statement 120, such as statement 4, from a database client 104. The SQL statement 120 can include a message that is to be published to one or more of the message brokers 106. In some implementations, the message can identify the message broker.

In some implementations, the SQL statement can be a call statement that includes a schema name, a message broker identifier (identifying message broker(s) 106), a topic, a quality of service (QOS), and the message. The QOS, for example, can be a code that indicates that the message is to be published at least once, at most once, or exactly once. The topic, for example, can be a subject or some other identifier to which clients 108 of the message broker 106 can subscribe in order to receive messages associated with that topic.

At 204, the received message is processed at the server. As an example, the SQL statement execution module 110 can process the SQL statement that constitutes the received message. In some implementations, the SQL statement execution module 110 can be a query processor or similar type of processor or components thereof. In some implementations, processing can include parsing the SQL statement and executing built-in procedures, which can perform the remaining steps of the method 200.

At 206, message broker configurations associated with the received message are determined. For example, the database server 102 can look up message broker configurations 116 that are associated with the received message. As described above, the association can be based on a matching <dst-id> which identifies the message broker(s) 106 to which the message is to be published. In some implementations, the message broker configurations can be identified to the database server 102 based in SQL statements 120, received before the message is received, that include message broker configuration information, such as information contained in statement 1.

At 208, the message is published, by invoking a messaging client at the server, to the one or more message brokers using at least the message broker configurations. For example, the messaging client 114 can publish the message, e.g., by providing a published message 122 to the message broker 106. Publishing the message can occur using the message broker configurations 116 that allow the messaging client 114 to connect to the message brokers 106 that are to receive the message. In some implementations, publishing the message includes accessing user credentials in a credential store.

In some implementations, publishing the message does not require that the message be sent, from an application layer outside of the database server. Rather, the publishing to particular ones of the message brokers 106 can occur entirely within the database server 102.

In some implementations, the message that is published can be a text message (e.g., sent through a messaging application, a mobile device, an email system, or other source). In some implementations, the message that is to be published can be one or more data elements from database tables, such as KPIs or other information available to, or accessed by, the database server 102. In some implementations, the SQL statements 120 that identify a message to be published can include information that is used by the database server to look up or otherwise access database information that is to be published by itself or combined with a received message.

In some implementations, publishing the message can include using a previously-stored message broker configuration, such as if statement 1 for a message broker 106 was received at an earlier time. In some implementations, publishing the message can include using a new message broker configuration received from the database client with the message to be published, such as if statements 1 and 4 are received together or combined in some way.

In some implementations, the method 200 can further include steps for authentication. For example, user credentials can be received at the database server 102 and from the database client 104. The credentials can be used for authentication, by the database server, with the message broker 106 prior to publishing the message. Before publishing the message, for example, the database server 102 can authenticate with the message broker 106 using the received credentials. In some implementations, the credentials can be stored in the credential store 118 for use by the database server 102. In some implementations, the user credentials received from the database client 104 can include credential creation statements, such as the statements 2 and 3 described above, identifying a user identifier and a password for the user. In some implementations, the credentials can be received (e.g., substantially at the same time) with a message to be published.

In some implementations, the method 200 can further include steps for receiving and using message broker destination information. For example, a definition of a message broker destination can be received at the server and from the database client. Before publishing the message, for example, information associated with the message broker and for use in publishing the message can be retrieved (e.g., from the database). In some implementations, the definition of a message broker destination can include a schema name, an identifier for a particular message broker, a distribution type, and a connection string identifying a host, a port, and connection parameters for connecting to a particular message broker. For example, the statement 1 described above can be used for defining message broker destination information.

In some implementations, the method 200 can further include steps for using database triggers. For example, pre-defined database triggers can be executed in the database server 102 upon a change in a database, such as an updated or inserted value or a table change. Using trigger information from the triggers, for example, a trigger-initiated message to be published can be generated. By invoking the messaging client at the server, the trigger-initiated message (e.g., an updated KPI) can be published to the one or more message brokers 106 using at least the message broker configurations and the trigger information.

Figure 3:
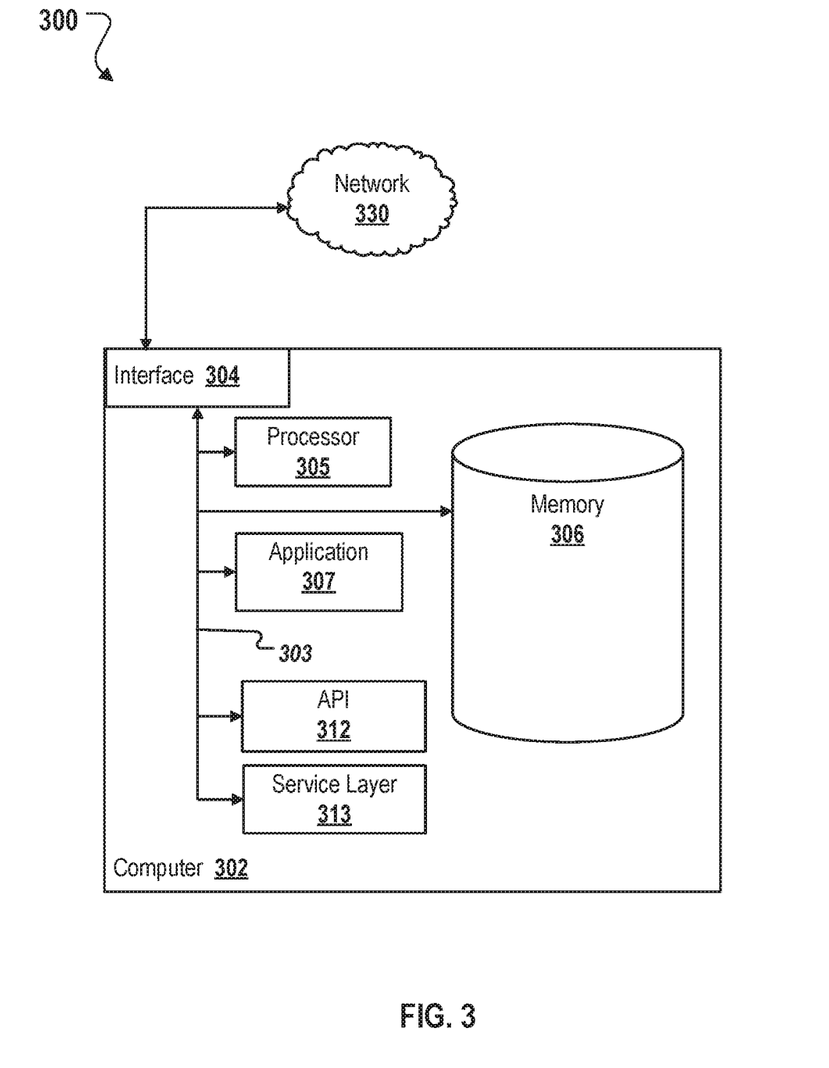
FIG. 3 is a block diagram of an exemplary computer system used to provide computational functionalities associated with described algorithms, methods, functions, processes, flows, and procedures as described in the instant disclosure.

FIG. 3 is a block diagram of an exemplary computer system 300 used to provide computational functionalities associated with described algorithms, methods, functions, processes, flows, and procedures as described in the instant disclosure.

The illustrated computer 302 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 302 may comprise a computer that includes an input device, such as a keypad, keyboard, touch screen, or other device that can accept user information, and an output device that conveys information associated with the operation of the computer 302, including digital data, visual, or audio information (or a combination of information), or a GUI.

The computer 302 can serve in a role as a client, network component, a server, a database or other persistency, or any other component (or a combination of roles) of a computer system for performing the subject matter described in the instant disclosure. The illustrated computer 302 is communicably coupled with a network 330. In some implementations, one or more components of the computer 302 may be configured to operate within environments, including cloud-computing-based, local, global, or other environment (or a combination of environments).

At a high level, the computer 302 is an electronic computing device operable to receive, transmit, process, store, or manage data and information associated with the described subject matter. According to some implementations, the computer 302 may also include or be communicably coupled with an application server, e-mail server, web server, caching server, streaming data server, business intelligence (BI) server, or other server (or a combination of servers).

The computer 302 can receive requests over network 330 from a client application (for example, executing on another computer 302) and responding to the received requests by processing the said requests in an appropriate software application. In addition, requests may also be sent to the computer 302 from internal users (for example, from a command console or by other appropriate access method), external or third-parties, other automated applications, as well as any other appropriate entities, individuals, systems, or computers.

Each of the components of the computer 302 can communicate using a system bus 303. In some implementations, any or all of the components of the computer 302, both hardware or software (or a combination of hardware and software), may interface with each other or the interface 304 (or a combination of both) over the system bus 303 using an application programming interface (API) 312 or a service layer 313 (or a combination of the API 312 and service layer 313). The API 312 may include specifications for routines, data structures, and object classes. The API 312 may be either computer-language independent or dependent and refer to a complete interface, a single function, or even a set of APIs. The service layer 313 provides software services to the computer 302 or other components (whether or not illustrated) that are communicably coupled to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in extensible markup language (XML) format or other suitable format. While illustrated as an integrated component of the computer 302, alternative implementations may illustrate the API 312 or the service layer 313 as stand-alone components in relation to other components of the computer 302 or other components (whether or not illustrated) that are communicably coupled to the computer 302. Moreover, any or all parts of the API 312 or the service layer 313 may be implemented as child or sub-modules of another software module, enterprise application, or hardware module without departing from the scope of this disclosure.

The computer 302 includes an interface 304. Although illustrated as a single interface 304 in FIG. 3, two or more interfaces 304 may be used according to particular needs, desires, or particular implementations of the computer 302. The interface 304 is used by the computer 302 for communicating with other systems in a distributed environment that are connected to the network 330 (whether illustrated or not). Generally, the interface 304 comprises logic encoded in software or hardware (or a combination of software and hardware) and operable to communicate with the network 330. More specifically, the interface 304 may comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors may be used according to particular needs, desires, or particular implementations of the computer 302. Generally, the processor 305 executes instructions and manipulates data to perform the operations of the computer 302 and any algorithms, methods, functions, processes, flows, and procedures as described in the instant disclosure.

The computer 302 also includes a memory 306 that holds data for the computer 302 or other components (or a combination of both) that can be connected to the network 330 (whether illustrated or not). For example, memory 306 can be a database storing data consistent with this disclosure. Although illustrated as a single memory 306 in FIG. 3, two or more memories may be used according to particular needs, desires, or particular implementations of the computer 302 and the described functionality. While memory 306 is illustrated as an integral component of the computer 302, in alternative implementations, memory 306 can be external to the computer 302.

The application 307 is an algorithmic software engine providing functionality according to particular needs, desires, or particular implementations of the computer 302, particularly with respect to functionality described in this disclosure. For example, application 307 can serve as one or more components, modules, applications, etc. Further, although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, a computer system containing computer 302, each computer 302 communicating over network 330. Further, the term "client," "user," and other appropriate terminology may be used interchangeably as appropriate without departing from the scope of this disclosure. Moreover, this disclosure contemplates that many users may use one computer 302, or that one user may use multiple computers 302.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulate data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
    defining a message-sending procedure, the message-sending procedure being a built-in procedure in a database and configured to invoke a messaging client at a database server to publish messages to one or more message brokers using at least message broker configurations;
    receiving, at the database server and from a database client:
        a message in the form of a structured query language (SQL) statement to be published to the one or more message brokers; and
        a definition of a message broker destination;
    processing, at the database server, the received message;
    determining the message broker configurations associated with the received message;
    before publishing the message, retrieving information associated with the message broker for use in publishing the message, wherein the definition of the message broker destination includes a schema name, an identifier for a particular message broker, a distribution type, and a connection string identifying a host, a port, and connection parameters for connecting to a particular message broker; and
    publishing, by calling a message-sending procedure built into the database and the message-sending procedure invoking the messaging client at the database server, the message to the one or more message brokers using at least the message broker configurations, wherein publishing the message includes using a previously-stored message broker configuration or using a new message broker configuration received from the database client with the message to be published.

2. The computer-implemented method of claim 1, wherein the SQL statement is a call statement including a schema name, a message broker identifier, a topic, a quality of service, and the message.

3. The computer-implemented method of claim 2, wherein the quality of service is a code that indicates that the message is to be published at least once, at most once, or exactly once.

4. The computer-implemented method of claim 1, further comprising:
    receiving, at the database server and from the database client, user credentials for authentication, by the database server, with the message broker prior to publishing the message; and
    before publishing the message, authenticating with the message broker using the received credentials.

5. The computer-implemented method of claim 4, wherein receiving the user credentials includes receiving, from the database client, credential creation statements identifying a user identifier and a password for the user.

6. The computer-implemented method of claim 4, wherein the user credentials are received with the message.

7. The computer-implemented method of claim 1, wherein the message further identifies the message broker, and wherein publishing the message include accessing user credentials in a credential store.

8. The computer-implemented method of claim 1, wherein publishing the message does not require that the message be sent, to the message broker, from an application layer outside of the database server.

9. The computer-implemented method of claim 1, wherein the message includes one or more of a text message and one or more data elements from database tables.

10. The computer-implemented method of claim 1, further comprising:
    executing database triggers in the database server upon a change in a database;

generating, using trigger information from the triggers, a trigger-initiated message to be published; and publishing, by invoking the messaging client at the database server, the trigger-initiated message to the one or more message brokers using at least the message broker configurations and the trigger information.

11. A system comprising:

memory storing user preferences, user contexts and optimized queues; and one or more servers performing operations comprising:

defining a message-sending procedure, the message-sending procedure being a built-in procedure in a database and configured to invoke a messaging client at a database server to publish messages to one or more message brokers using at least message broker configurations;

receiving, at the database server and from a database client:

a message in the form of a structured query language (SQL) statement to be published to the one or more message brokers;

a definition of a message broker destination;

processing, at the database server, the received message;

determining the message broker configurations associated with the received message;

before publishing the message, retrieving information associated with the message broker for use in publishing the message, wherein the definition of the message broker destination includes a schema name, an identifier for a particular message broker, a distribution type, and a connection string identifying a host, a port, and connection parameters for connecting to a particular message broker: and publishing, by calling a message-sending procedure built into the database and the message-sending procedure invoking the messaging client at the database server, the message to the one or more message brokers using at least the message broker configurations, wherein publishing the message includes using a previously-stored message broker configuration or using a new message broker configuration received from the database client with the message to be published.

12. The system of claim 11, wherein the SQL statement is a call statement including a schema name, a message broker identifier, a topic, a quality of service, and the message.

13. The system of claim 12, wherein the quality of service is a code that indicates that the message is to be published at least once, at most once, or exactly once.

14. The system of claim 11, the operations further comprising:

receiving, at the database server and from the database client, user credentials for authentication, by the database server, with the message broker prior to publishing the message; and before publishing the message, authenticating with the message broker using the received credentials.

15. A non-transitory computer-readable media encoded with a computer program, the program comprising instructions that when executed by one or more computers cause the one or more computers to perform operations comprising:

defining a message-sending procedure, the message-sending procedure being a built-in procedure in a database and configured to invoke a messaging client at a database server to publish messages to one or more message brokers using at least message broker configurations;

receiving, at the database server and from a database client:

a message in the form of a structured query language (SQL) statement to be published to the one or more message brokers; and a definition of a message broker destination;

processing, at the database server, the received message;

determining the message broker configurations associated with the received message;

before publishing the message, retrieving information associated with the message broker for use in publishing the message, wherein the definition of the message broker destination includes a schema name, an identifier for a particular message broker, a distribution type, and a connection string identifying a host, a port, and connection parameters for connecting to a particular message broker; and publishing, by calling a message-sending procedure built into the database and the message-sending procedure invoking the messaging client at the database server, the message to the one or more message brokers using at least the message broker configurations, wherein publishing the message includes using a previously-stored message broker configuration or using a new message broker configuration received from the database client with the message to be published.

16. The non-transitory computer-readable media of claim 15, wherein the SQL statement is a call statement including a schema name, a message broker identifier, a topic, a quality of service, and the message.

17. The non-transitory computer-readable media of claim 16, wherein the quality of service is a code that indicates that the message is to be published at least once, at most once, or exactly once.

18. The non-transitory computer-readable media of claim 15, the operations further comprising:

receiving, at the database server and from the database client, user credentials for authentication, by the database server, with the message broker prior to publishing the message; and before publishing the message, authenticating with the message broker using the received credentials.

\* \* \* \* \*